US012769649B2

(12) United States Patent
Lee

(10) Patent No.: US 12,769,649 B2
(45) Date of Patent: Oct. 20, 2026

(54) STORAGE DEVICE AND METHOD OF OPERATING THE SAME

(71) Applicant: SAMSUNG ELECTRONICS CO., LTD., Suwon-si (KR)

(72) Inventor: Youngmin Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 144 days.

(21) Appl. No.: 18/951,200

(22) Filed: Nov. 18, 2024

(65) Prior Publication Data

US 2025/0217281 A1 Jul. 3, 2025

(30) Foreign Application Priority Data

Dec. 27, 2023 (KR) ........................ 10-2023-0193179

(51) Int. Cl.
*G06F 12/02* (2006.01)
*G06F 12/0817* (2016.01)

(52) U.S. Cl.
CPC ...... *G06F 12/0246* (2013.01); *G06F 12/0292* (2013.01); *G06F 12/0824* (2013.01)

(58) Field of Classification Search
None
See application file for complete search history.

(56) References Cited

U.S. PATENT DOCUMENTS

| | | | |
|---|---|---|---|
| 8,402,202 B2 | 3/2013 | Park et al. | |
| 9,880,939 B2 | 1/2018 | Watanabe et al. | |
| 11,237,769 B2 | 2/2022 | Kanno | |
| 11,340,900 B2 | 5/2022 | Han et al. | |
| 2017/0024140 A1 | 1/2017 | Shivanand et al. | |
| 2021/0097004 A1 | 4/2021 | Nagarajan et al. | |
| 2021/0182166 A1 | 6/2021 | Hahn et al. | |
| 2022/0317878 A1 | 10/2022 | Lin | |
| 2023/0185713 A1 | 6/2023 | Palmer et al. | |
| 2024/0338322 A1* | 10/2024 | Shveidel | G06F 3/0659 |

FOREIGN PATENT DOCUMENTS

| | | |
|---|---|---|
| CN | 115309591 B | 3/2023 |
| KR | 10-1447188 | 10/2014 |
| KR | 10-2017-0010729 | 2/2017 |

* cited by examiner

*Primary Examiner* — Charles J Choi
(74) *Attorney, Agent, or Firm* — Fish & Richardson P.C.

(57) ABSTRACT

An example method of operating a storage controller that stores one or more logical to physical (L2P) tables includes receiving a request to modify a first logical page number (LPN) from a host, inserting a first node corresponding to the first LPN between a second node related to a second LPN and a third node corresponding to a third LPN, and determining whether a first L2P table is the same as a second L2P table based on a number of pages in an L2P table of the one or more L2P tables. The first L2P table includes the first LPN. The second L2P table includes the second LPN.

20 Claims, 14 Drawing Sheets

STORAGE DEVICE AND METHOD OF OPERATING THE SAME

CROSS-REFERENCE TO RELATED APPLICATION

This application claims priority under 35 U.S.C. § 119 to Korean Patent Application No. 10-2023-0193179, filed on Dec. 27, 2023, in the Korean Intellectual Property Office, the disclosure of which is incorporated by reference herein in its entirety.

BACKGROUND

A logical page number (LPN) and a physical page number (PPN) can be managed by a mapping table called a logical to physical (L2P) table. The L2P table and metadata related to this can be stored in static random access memory (SRAM). A method of reducing overhead of the L2P table and the metadata related to this is desired.

SUMMARY

The present disclosure relates to storage devices and methods of operating the same, including a metadata management method for a storage device.

In general, according to some aspects, a method of operating a storage controller that stores one or more logical to physical (L2P) tables includes receiving a request to modify a first logical page number (LPN) from a host, inserting a first node corresponding to the first LPN between a second node related to a second LPN and a third node corresponding to a third LPN, determining whether a "first L2P table including the first LPN" is the same as a "second L2P table including the second LPN", based on the number of pages included in one L2P table among the one or more L2P tables, determining whether the "first L2P table including the first LPN" is the same as a "third L2P table including the third LPN", based on the number of pages included in one L2P table among the one or more L2P tables, and increasing a comparison-based dirty L2P table counter by 1 when the first L2P table is different from both of the second L2P table and the third L2P table. The second LPN is greatest in an LPN group closest to the first LPN among LPNs less than the first LPN. The LPN group includes at least one consecutive LPN. The third LPN is least among LPNs greater than the first LPN. The first node, the second node, and the third node have a doubly-linked list structure.

In general, according to some aspects, a method of operating a storage controller that stores one or more logical to physical (L2P) tables includes receiving a request to modify a first logical page number (LPN) from a host, inserting a first node corresponding to the first LPN between a second node related to a second LPN and a third node related to a third LPN, determining whether a "first L2P table including the first LPN" is the same as a "second L2P table including the second LPN", based on the number of pages included in one L2P table among the one or more L2P tables, determining whether the "first L2P table including the first LPN" is the same as a "third L2P table including the third LPN", based on the number of pages included in one L2P table among the one or more L2P tables, and increasing a comparison-based dirty L2P table counter by 1 when the first L2P table is different from both of the second L2P table and the third L2P table. The second LPN is greatest in an LPN group closest to the first LPN among LPNs less than the first LPN. The LPN group includes at least one consecutive LPN. The third LPN is least among LPNs greater than the first LPN. The first node, the second node, and the third node have a single-linked list structure and tree structure.

In general, according to some aspects, a storage controller includes static random access memory (SRAM) configured to store one or more logical to physical (L2P) tables, a comparison-based dirty L2P table counter, and a plurality of nodes corresponding to a plurality of LPNs, and a processor. The processor is configured to receive a request to modify a first logical page number (LPN) from a host, insert a first node corresponding to the first LPN between a second node related to a second LPN and a third node corresponding to a third LPN, determine whether a "first L2P table including the first LPN" is the same as a "second L2P table including the second LPN", based on the number of pages included in one L2P table among the one or more L2P tables, determine whether the "first L2P table including the first LPN" is the same as a "third L2P table including the third LPN", based on the number of pages included in one L2P table among the one or more L2P tables, and increase the comparison-based dirty L2P table counter by 1 when the first L2P table is different from both of the second L2P table and the third L2P table. The second LPN is greatest in an LPN group closest to the first LPN among LPNs less than the first LPN. The LPN group includes at least one consecutive LPN. The third LPN is least among LPNs greater than the first LPN. The first node, the second node, and the third node have a doubly-linked list structure.

BRIEF DESCRIPTION OF THE DRAWINGS

Implementations will be more clearly understood from the following detailed description taken in conjunction with the accompanying drawings.

DETAILED DESCRIPTION

Various implementations are described below with reference to the attached drawings.

Figure 1:
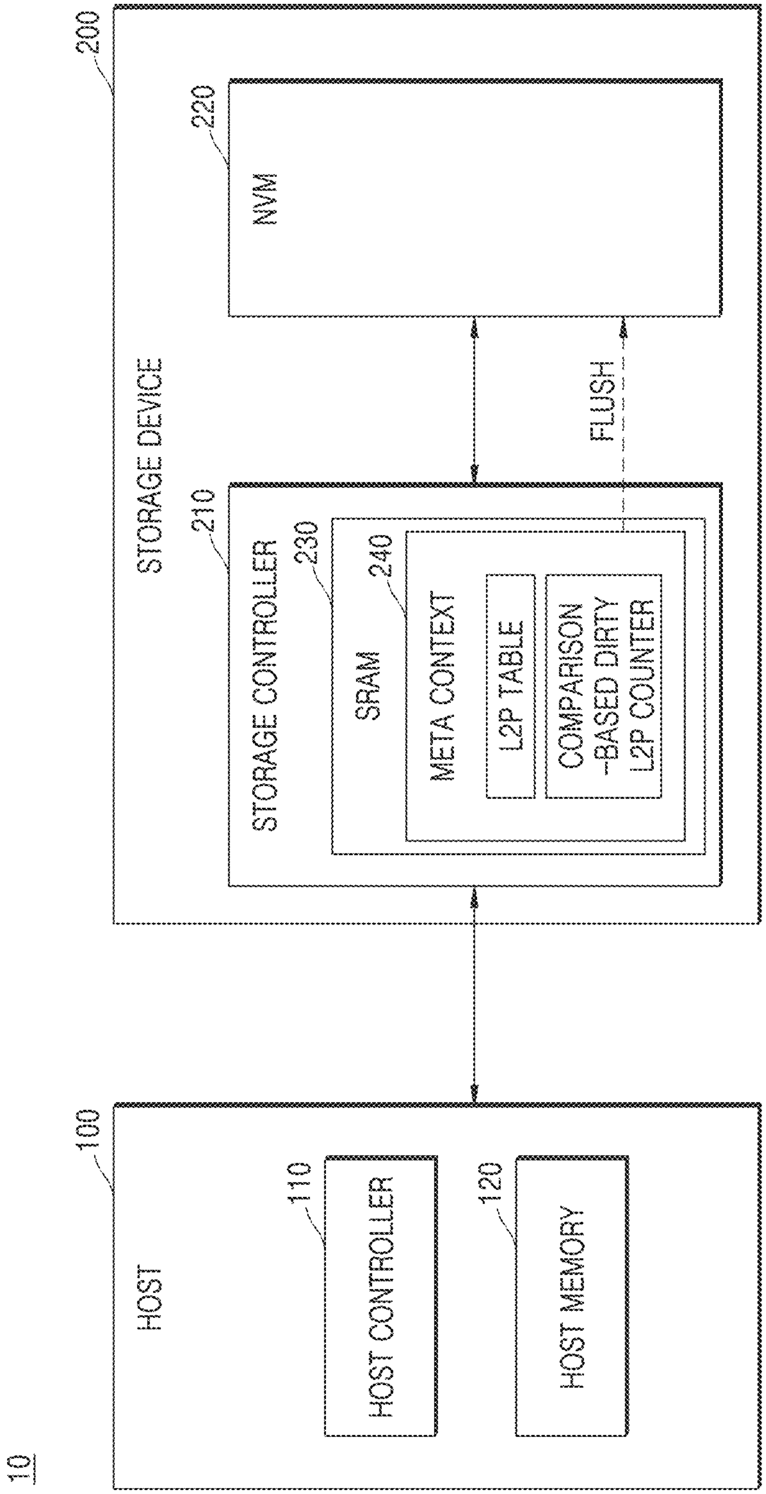
FIG. 1 illustrates a block diagram of an example of a host-storage system.

FIG. 1 illustrates a block diagram of an example of a host-storage system.

Referring to FIG. 1, a host-storage system 10 includes a host 100 and a storage device 200. Also, the storage device 200 may include a storage controller 210 and a nonvolatile memory (NVM) 220. The storage controller 210 may include SRAM 230. The storage controller 210 may further include components for controlling storage device 200, such as a processor. The SRAM 230 may store meta context 240. The meta context 240 may be referred to as metadata and may include logical to physical (L2P) table information and a comparison-based dirty L2P table counter.

The storage controller 210 may convert a logical address of a storage space managed by the host 100 into a physical address of a storage space of the nonvolatile memory 220. The storage controller 210 may convert a logical address of a logical address-based request received from the host 100 into a physical address and may respond to the request.

In some implementations, the host 100 may include a host controller 110 and a host memory 120. The host memory 120 may function as a buffer memory for temporarily storing data to be transmitted to the storage device 200 or data received from the storage device 200.

The storage device 200 may include storage media for storing data according to a request from the host 100. As an example, the storage device 200 may include at least one of a solid state drive (SSD), an embedded memory, and a detachable external memory. When the storage device 200 is an SSD, the storage device 200 may include a device complying with the nonvolatile memory express (NVMe) standard. When the storage device 200 is an embedded memory or a detachable external memory, the storage device 200 may include a device complying with a universal flash storage (UFS) or embedded multi-media card (eMMC) standard. The host 100 and the storage device 200 may each generate and transmit therebetween packets that comply with an adopted standard protocol.

When the nonvolatile memory 220 of the storage device 200 includes flash memory, the flash memory may include a 2D NAND memory array or a 3D (or vertical) NAND (VNAND) memory array. As another example, the storage device 200 may also include various other types of non-volatile memories. For example, the storage device 200 may include magnetic RAM (MRAM), spin-transfer torque MRAM, conductive bridging RAM (CBRAM), ferroelectric RAM (FeRAM), phase RAM (PRAM), resistive RAM, and various other types of memories.

In some implementations, the host controller 110 and the host memory 120 may be implemented as separate semiconductor chips. Alternatively, in some implementations, the host controller 110 and the host memory 120 may be integrated into the same semiconductor chip. As an example, the host controller 110 may include one of a plurality of modules provided in an application processor, and the application processor may be implemented as a system on chip (SoC). Also, the host memory 120 may include an embedded memory provided within the application processor, or may include a nonvolatile memory or a memory module disposed outside the application processor.

The host controller 110 may manage an operation of storing data (e.g., record data) of a buffer region of the host memory 120 in the nonvolatile memory 220, or storing data (e.g., read data) of the nonvolatile memory 220 in the buffer region of the host memory 120.

The storage controller 210 may include the SRAM 230 and the processor 213. The SRAM 230 may store L2P table information, a comparison-based dirty L2P table counter, and a plurality of nodes respectively corresponding to a plurality of logical page numbers (LPNs). The processor 213 may receive a request to modify a first LPN from the host 100. In response to the first LPN modification request, the processor 213 may insert a first node corresponding to the first LPN between a second node related to a second LPN and a third node corresponding to a third LPN. Before the first node is inserted between the second node and the third node, the second node and the third node may be nodes doubly linked to each other. The processor 213 may determine whether a "first L2P table including the first LPN" is the same as a "second L2P table including the second LPN", based on the number of pages included in one L2P table among one or more L2P tables. The processor 213 may determine whether the "first L2P table including the first LPN" is the same as a "third L2P table including the third LPN", based on the number of pages included in one L2P table among the one or more L2P tables. When the first L2P table is different from both of the second L2P table and the third L2P table, the processor 213 may increase a comparison-based dirty L2P table counter by 1. When the first L2P table is the same as at least one of the second L2P table and the third L2P table, the processor 213 may maintain, without increasing, the comparison-based dirty L2P table counter. The second LPN is the greatest value of an LPN group closest to the first LPN among LPNs less than the first LPN. The LPN group may include at least one consecutive LPN. The third LPN is a value closest to the first LPN among LPNs greater than the first LPN. The first node, the second node, and the third node may have a doubly-linked list structure. Based on the first node, the second node may be a previous node and the third node may be a next node. The first node, the second node, and the third node may doubly linked to each other. Specifically, the first node and the second node may be doubly linked to each other and the second node and the third node may be doubly linked to each other. In some implementations, the first node, the second node, and the third node may have a single-linked list structure and tree structure. The processor 213 may determine whether the first L2P table is the same as the second L2P table, by comparing whether the quotient obtained by dividing the first LPN by the number of pages is the same as the quotient obtained by dividing the second LPN by the number of the pages. The processor 213 may determine whether the first L2P table is the same as the third L2P table, by comparing whether the quotient obtained by dividing the first LPN by the number of pages is the same as the quotient obtained by dividing the third LPN by the number of pages. Here, the number of pages refers to the number of pages included in the L2P table. The number of pages included in each of the first L2P table to the third L2P table may all be the same. When the first LPN is already valid before insertion of the first node, the processor 213 may maintain, without increasing, the comparison-based dirty L2P table counter. The processor 213 may flush one or more L2P tables to the nonvolatile memory 220, based on at least one of the number of one or more L2P tables and a comparison-based L2P counter value. For example, when the comparison-based L2P counter value is equal to or greater than a threshold value, the processor 213 may flush the one or more L2P tables to the nonvolatile memory 220. The second node may include information on the number of consecutive LPNs included in an LPN group closest to the first LPN among LPN groups less than the first LPN. The third node may include information on the number of consecutive LPNs included in an LPN group closest to the first LPN among LPN groups greater than the first LPN. The processor 213 may identify the second LPN, by identifying the least LPN of an LPN group closest to the first LPN among LPNs less than the first LPN and the information on the number of consecutive LPNs.

The host-storage system 10 may reduce the capacity of SRAM for meta context management.

The storage controller 210 maintains or increases a comparison-based dirty L2P table counter, by comparing a node corresponding to a newly inserted LPN with both a previous node and a next node and therefore, dramatically reduces a required amount of SRAM memory compared to using a bitmap-based dirty L2P table counter.

The storage controller 210 may efficiently count a mapping table including an LPN that is updated/discarded.

The storage controller 210 may reduce overhead of counting a mapping table including an LPN that is updated/discarded.

The storage controller 210 may reduce the required capacity of SRAM by using a comparison-based dirty L2P table counter. Accordingly, the storage controller 210 may manage an L2P table and an L2P table counter without on-domain SRAM always operating.

Figure 2:
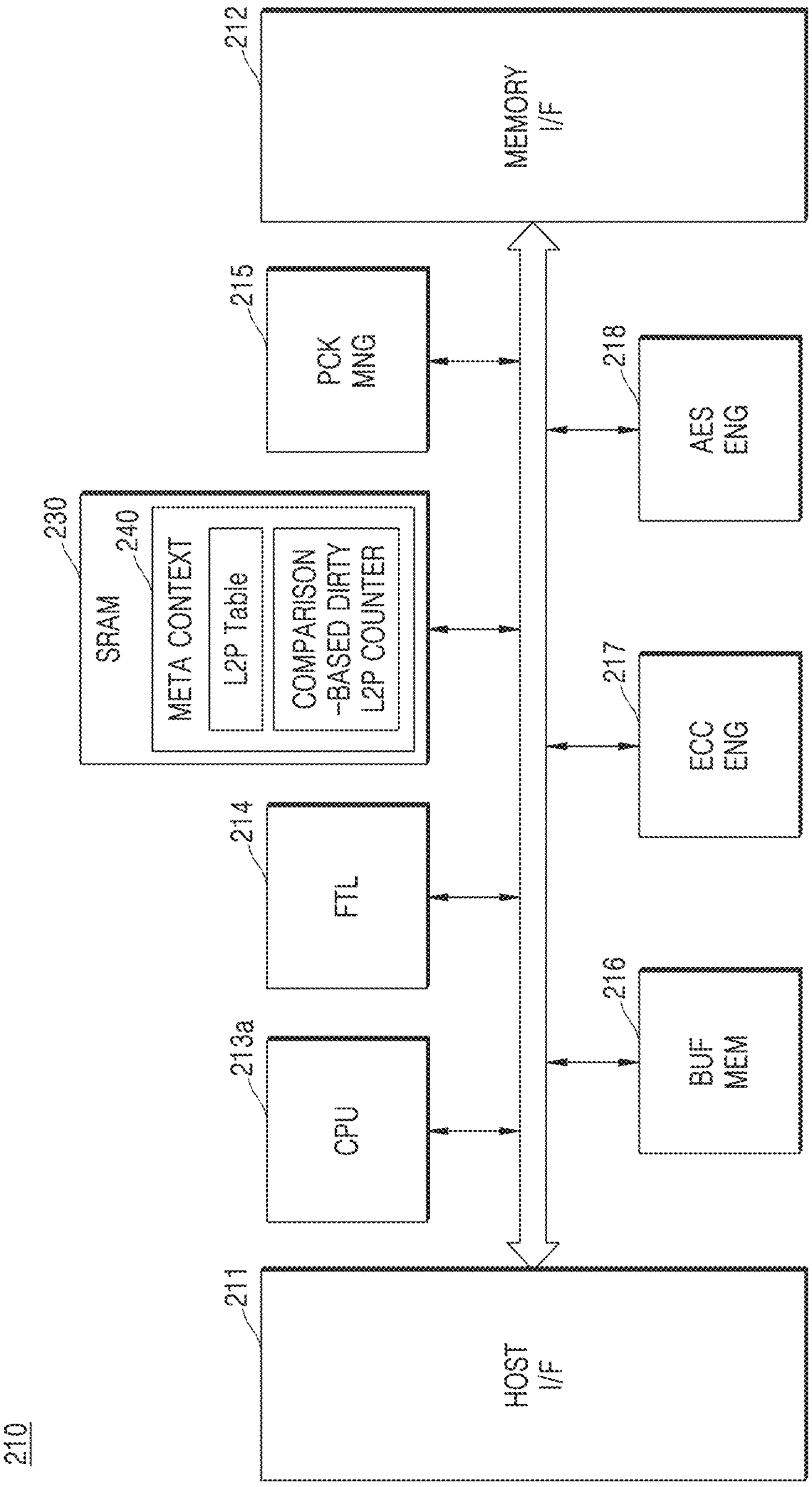
FIG. 2 illustrates an example of a storage controller.

FIG. 2 illustrates an example of a storage controller.

FIG. 2 may be described with reference to FIG. 1, and a repeated description may be omitted. Referring to FIG. 2, a storage controller 210 may include a host interface HOST I/F 211, a memory interface MEMORY I/F 212, and a central processing unit (CPU) 213*a*. Also, the storage controller 210 may further include a flash translation layer (FTL) 214, SRAM 230, a packet manager PCK MNG 215, a buffer memory BUF MEM 216, an error correction code (ECC) engine 217, and an advanced encryption standard (AES) engine 218.

The storage controller 210 may further include a working memory to which the FTL 214 is loaded, and the CPU 213*a* may execute the FTL 214, thereby controlling data write and read operations for the nonvolatile memory 220.

The host interface HOST I/F 211 may transmit and receive packets with the host 100. A packet transmitted from the host 100 to the host interface HOST I/F 211 may include a command, data to be written to the nonvolatile memory 220, or the like, and a packet transmitted from the host interface HOST I/F 211 to the host 100 may include a response to a command, data read from the nonvolatile memory 220, or the like. The memory interface MEMORY I/F 212 may transmit data to be written to the nonvolatile memory 220, to the nonvolatile memory 220, or receive data read from the nonvolatile memory 220. The memory interface MEMORY I/F 212 may be implemented to comply with a standard protocol such as Toggle or open NAND flash interface (ONFI).

The FTL 214 may include firmware or software driven by the storage controller 210. The FTL 214 may perform several functions such as address mapping, wear-leveling, and garbage collection. The address mapping operation includes an operation of changing a logical address received from the host 100 into a physical address used to actually store data in the nonvolatile memory 220. The wear-leveling operation is technology for preventing excessive deterioration of a specific block by allowing blocks in the nonvolatile memory 220 to be used uniformly, and for example, may be implemented through firmware technology of balancing erase counts of physical blocks. The garbage collection operation is technology for securing a capacity usable in the nonvolatile memory 220 through a method of copying valid data of a block to a new block and then erasing the existing block.

The packet manager PCK MNG 215 may generate packets complying with a protocol of an interface negotiated with the host 100, or parse a variety of information from packets received from the host 100. Also, the buffer memory BUF MEM 216 may temporarily store data to be recorded to the nonvolatile memory 220 or data to be read from the nonvolatile memory 220. The buffer memory BUF MEM 216 may be provided within the storage controller 210 but may also be disposed outside the storage controller 210.

The ECC engine 217 may perform an error detection and correction function for read data read from the nonvolatile memory 220. More specifically, the ECC engine 217 may generate parity bits for write data to be written to the nonvolatile memory 220, and the parity bits generated in this way may be stored in the nonvolatile memory 220 together with the write data. When data is read from the nonvolatile memory 220, the ECC engine 217 may correct errors of the read data by using the parity bits read from the nonvolatile memory 220 together with the read data and may output the error-corrected read data.

The AES engine 218 may perform at least one of an encryption operation and a decryption operation on data input to the storage controller 210 by using a symmetric-key algorithm.

The SRAM 230 may store the meta context 240. The meta context 240 may be referred to as metadata and may include L2P table information and a comparison-based dirty L2P table counter. The storage controller 210 may flush the meta context 240 to the nonvolatile memory 220 by using the FTL 214.

Figure 3:
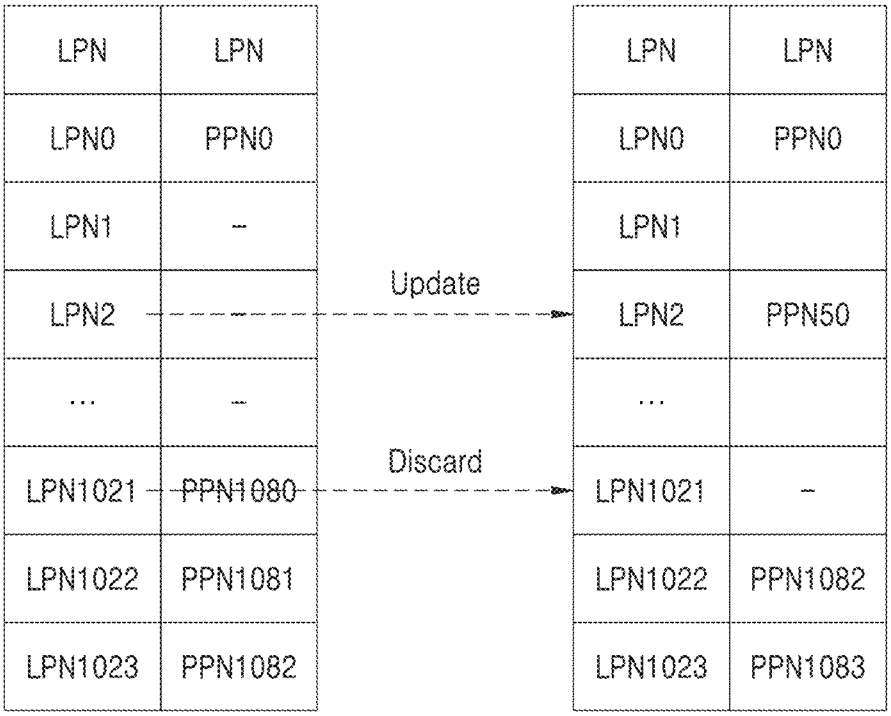
FIG. 3 is a diagram illustrating an example of an L2P table.

FIG. 3 is a diagram illustrating an example of an L2P table.

FIG. 3 may be described with reference to FIG. 1, and a repeated description may be omitted. L2P table information includes mapping information between an LPN and a physical page number (PPN). Specifically, the L2P table information may include mapping information between a physical address within the nonvolatile memory 220 and a logical address corresponding to the physical address. The L2P table information including a mapping table may be also referred to as mapping table information.

In general, a NAND flash memory device does not support an overwrite operation. In order to modify data, the NAND flash memory device may program data of a new page into a free page existing in a corresponding block or another block and perform address mapping on this by using an FTL. As a result, a page in which previous page data is programmed may become an invalid page and a page in which new page data is programmed may become a valid page. Accordingly, the valid page and the invalid page may coexist within one block.

Referring to FIG. 3, an L2P table on the left includes mapping information between 1024 LPNs and PPNs. For example, LPN0 may be mapped to PPN0, LPN1 and LPN2 may not be mapped to a physical address, and LPN1021 to LPN1023 may be mapped to PPN1080 to PPN1082, respectively. The mapping information may be modified according to a request of the host 100. For example, the storage controller 210 may update LPN2 to be mapped to PPN50 according to the request of the host 100. In another example, the storage controller 210 may discard the mapping between LPN1021 and PPN1080 according to the request of the host 100. That is, the modification of the mapping information may include at least one of updating the mapping and discarding the mapping. When there is a modification of at least one page among 1024 pages within the L2P table, a dirty L2P table count may increase. In FIG. 3, since there is a modification of LPN2 and LPN1021, the dirty L2P table count may increase.

Figure 4:
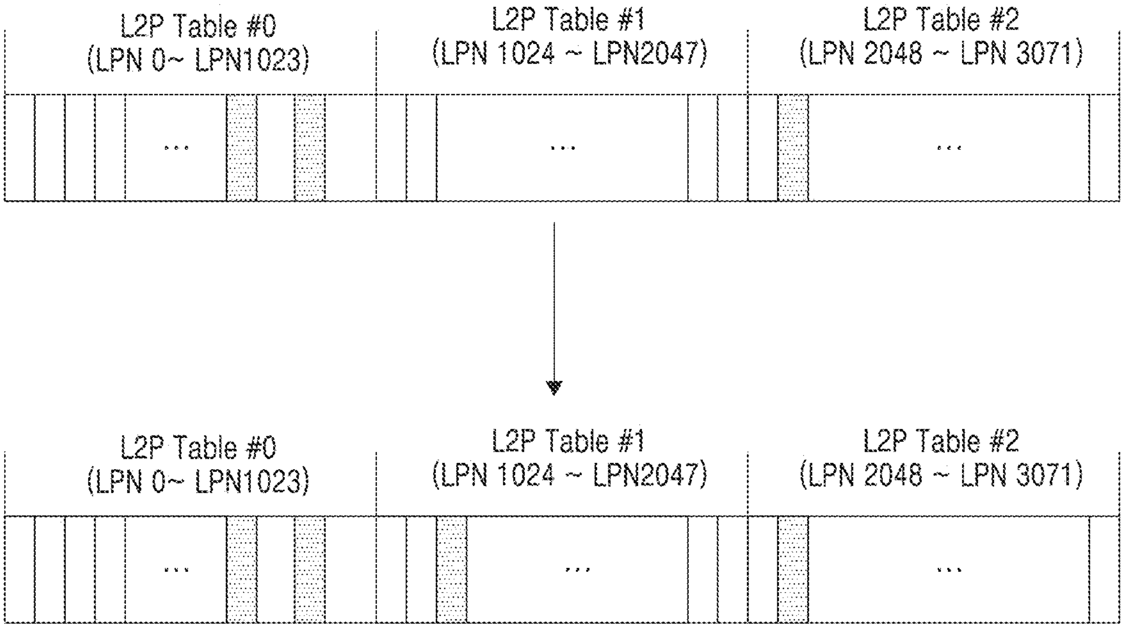
FIG. 4 is a diagram illustrating an example of a dirty L2P table count.

FIG. 4 is a diagram illustrating an example of a dirty L2P table count.

FIG. 4 may be described with reference to FIG. 1. As described above in FIG. 3, the modification of at least one page among a plurality of pages in an L2P table may occur. When at least one page has been modified, the corresponding L2P table may be a modified L2P table. A dirty L2P table count means the number of modified L2P tables. In other words, the dirty L2P table count means the number of L2P tables including modified pages among a plurality of L2P tables.

Referring to FIG. 4, each of L2P table #0, L2P table #1, and L2P table #2 includes mapping information of a page. A dotted box indicates a modified and valid page. For example, referring to the L2P tables at the top of FIG. 4, L2P table #0 has two modified pages, L2P table #1 has no modified page, and L2P table #2 has one modified page. Since a total of two L2P tables, L2P table #0 and L2P table #2, include the modified pages, a value of the dirty L2P table count is equal to 2. Thereafter, a page of L2P table #1 may be modified according to a request of the host 100. L2P table #1 at the bottom of FIG. 4 indicates that a page of L2P table #1 has been modified. In this case, since three L2P tables include modified pages, the value of the dirty L2P table count may be equal to 3.

The storage controller 210 may determine whether a dirty L2P table count increases, by comparing a newly modified first LPN with existing changed LPNs. Therefore, in the present disclosure, a dirty L2P table counter used by the storage controller 210 is referred to as a comparison-based dirty L2P table counter.

Figure 5:
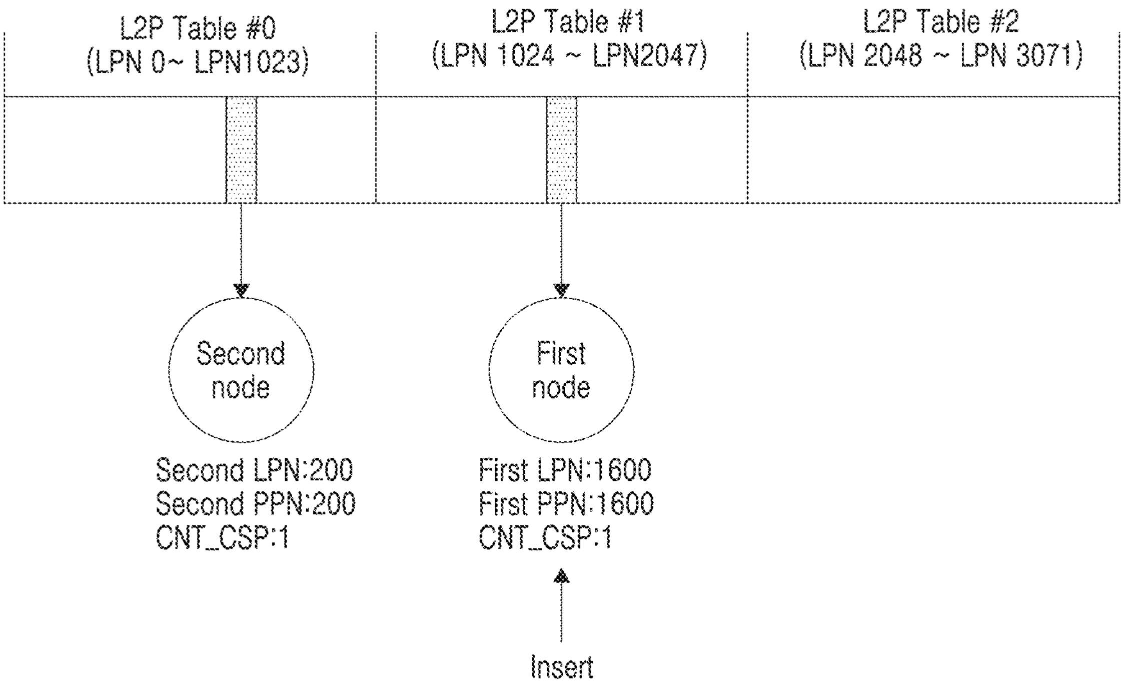
FIG. 5 illustrates an example of a method of managing a comparison-based dirty L2P table counter.

FIG. 5 illustrates an example of a method of managing a comparison-based dirty L2P table counter.

FIG. 5 may be described with reference to FIG. 1, and a repeated description may be omitted. It is assumed that L2P table information includes 1024 pieces of mapping information.

Referring to FIG. 5, a second LPN LPN200 is an existing modified page, and the storage controller 210 may newly modify a first LPN LPN1600 according to a request of the host 100. Since the second LPN LPN200 is less than the first LPN LPN1600, the second LPN LPN200 may be referred to as a previous LPN. The first LPN LPN1600 may be referred to as a current LPN. It is obvious that the first LPN LPN1600 and the second LPN LPN200 may be different pages and are not limited to the above-described implementation of the second LPN LPN200 and the first LPN LPN1600.

Referring to FIG. 5, when only a second node already exists, the storage controller 210 may insert a first node. The second node corresponds to the second LPN LPN200. Accordingly, the second node may be a previous node of the first node. The second LPN LPN200 is an existing modified LPN and located in L2P table #0. The second node may include the second LPN LPN200, a second PPN PPN200 mapped to the second LPN LPN200, and information on the number CNT_CSP of modified LPNs consecutive from the second LPN LPN200. Since a value of the number CNT_CSP of modified LPNs consecutive from the second LPN LPN200 is equal to 1, one second LPN LPN200 is a modified LPN.

The first LPN LPN1600 is an LPN newly modified according to a request of the host 100 and located in L2P table #1. The first node may include the first LPN LPN1600, a first PPN PPN1600 mapped to the first LPN LPN1600, and information on the number CNT_CSP of modified LPNs consecutive from the first LPN LPN1600. Since a value of the number CNT_CSP of modified LPNs consecutive from the first LPN LPN1600 is equal to 1, one first LPN LPN1600 is a modified LPN.

The storage controller 210 may use a data structure for comparing the first node to the second node. In some implementations, when the second LPN LPN200 already exists and the storage controller 210 newly modifies the first LPN LPN1600, the storage controller 210 may insert the first node and may doubly link the first node to the second node. That is, the first node and the second node may have a doubly-linked list structure. According to some implementations, when the second LPN LPN200 already exists and the storage controller 210 newly modifies the first LPN LPN1600, the storage controller 210 may insert the first node and may link the first node and the second node to have a tree structure and single-linked list structure.

The storage controller 210 may determine whether L2P table #0 including the second LPN LPN200 is the same as L2P table #1 including the first LPN LPN1600. For example, the storage controller 210 may determine whether the quotient obtained by dividing the second LPN LPN200 by the number (1024) of pages included in the L2P tables is the same as the quotient obtained by dividing the first LPN LPN1600 by the number (1024) of pages included in the L2P tables. The quotient obtained by dividing the second LPN LPN200 by 1024 is equal to 0, and the quotient obtained by dividing the first LPN LPN1600 by 1024 is equal to 1. Since the quotients are different from each other, the storage controller 210 may determine that L2P table #0 including the second LPN LPN200 is different from L2P table #1 including the first LPN LPN1600. Accordingly, the storage controller 210 may increase a comparison-based dirty L2P table counter by 1. Previously, the second LPN LPN200 was modified, and the comparison-based dirty L2P table counter was increased from 0 to 1. Therefore, when the first LPN LPN1600 is newly modified, the storage controller 210 may increase the comparison-based dirty L2P table counter from 1 to 2.

Figure 6:
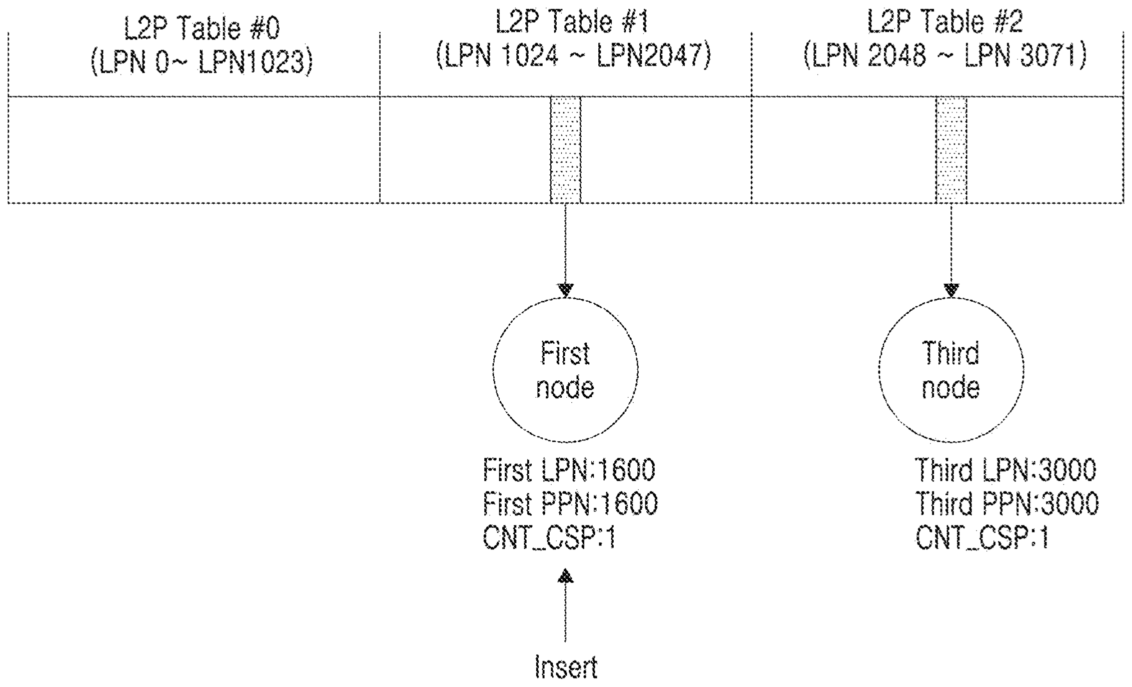
FIG. 6 illustrates an example of a method of managing a comparison-based dirty L2P table counter.

FIG. 6 illustrates an example of a method of managing a comparison-based dirty L2P table counter.

FIG. 6 may be described with reference to FIGS. 1 and 5, and a repeated description may be omitted. It is assumed that an L2P table includes 1024 pages. Referring to FIG. 6, a third LPN LPN3000 is an existing modified page, and the storage controller 210 may newly modify a first LPN LPN1600 according to a request of the host 100. Since the third LPN LPN3000 is greater than the first LPN LPN1600, the third LPN may be referred to as a next LPN. Since a second LPN LPN200 is less than the first LPN LPN1600, the second LPN may be referred to as a previous LPN. The first LPN LPN1600 may be referred to as a current LPN.

Referring to FIG. 6, when only a third node already exists, the storage controller 210 may insert a first node. The third node corresponds to the third LPN LPN3000. Accordingly, the third node may be a next node of the first node. The third LPN LPN3000 is an existing modified LPN and located in L2P table #2. The third node may include the third LPN LPN3000, a third PPN PPN3000 mapped to the third LPN LPN3000, and information on the number CNT_CSP of modified LPNs consecutive from the third LPN LPN3000. Since a value of the number CNT_CSP of modified LPNs consecutive from the third LPN LPN3000 is equal to 1, one third LPN LPN3000 is a modified LPN.

The first LPN LPN1600 is an LPN newly modified according to a request of the host 100 and located in L2P table #1.

The storage controller 210 may use a data structure for comparing the first node to the third node. In some implementations, when the third LPN LPN3000 already exists and the storage controller 210 newly modifies the first LPN LPN1600, the storage controller 210 may insert the first node and may doubly link the first node to the third node. That is, the first node and the third node may have a doubly-linked list structure. According to some implementations, when the third LPN LPN3000 already exists and the storage controller 210 newly modifies the first LPN LPN1600, the storage controller 210 may insert the first node and may link the first node and the third node to have a tree structure and single-linked list structure.

The storage controller 210 may determine whether L2P table #2 including the third LPN LPN3000 is the same as L2P table #1 including the first LPN LPN1600. For example, the storage controller 210 may determine whether the quotient obtained by dividing the first LPN LPN1600 by the number (1024) of pages included in the L2P tables is the same as the quotient obtained by dividing the third LPN LPN3000 by the number (1024) of pages included in the L2P tables. The quotient obtained by dividing the first LPN LPN1600 by 1024 is equal to 1, and the quotient obtained by dividing the third LPN LPN3000 by 1024 is equal to 2. Since the quotients are different from each other, the storage controller 210 may determine that L2P table #1 including the first LPN LPN1600 is different from L2P table #2 including the third LPN LPN3000. Accordingly, the storage controller 210 may increase the comparison-based dirty L2P table counter by 1. Previously, the third LPN LPN3000 was modified, and the comparison-based dirty L2P table counter was increased from 0 to 1. Therefore, when the first LPN LPN1600 is newly modified, the storage controller 210 may increase the comparison-based dirty L2P table counter from 1 to 2.

Figure 7:
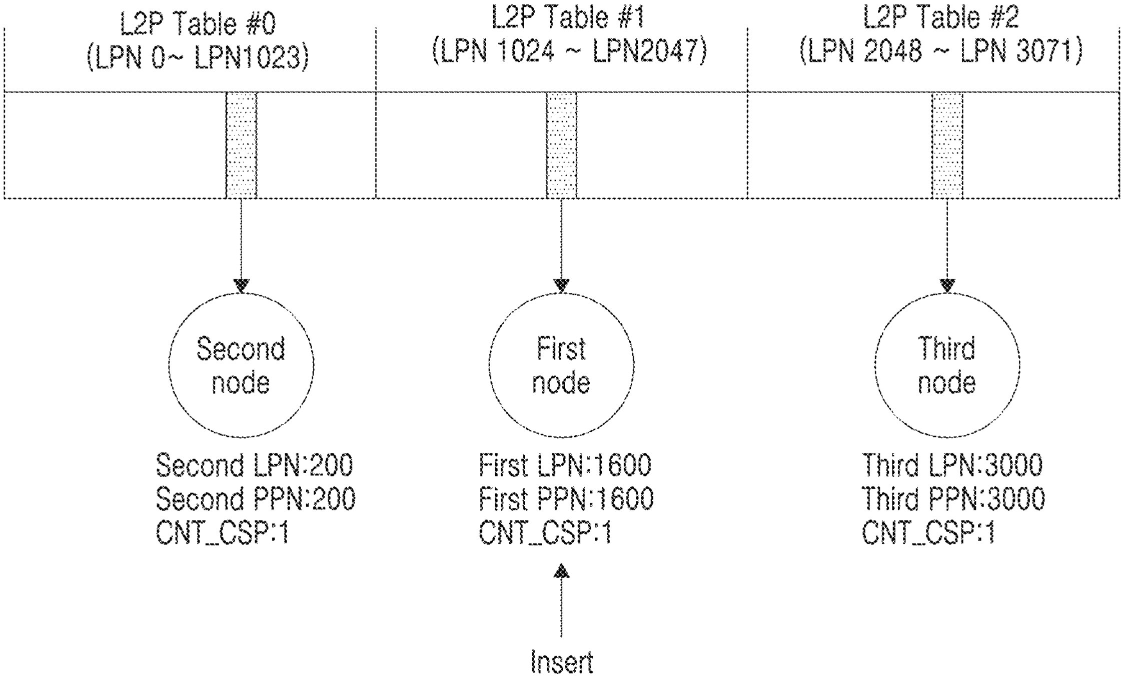
FIG. 7 illustrates an example of a method of managing a comparison-based dirty L2P table counter.

FIG. 7 illustrates an example of a method of managing a comparison-based dirty L2P table counter.

FIG. 7 may be described with reference to FIGS. 1, 5, and 6, and a repeated description may be omitted. It is assumed that an L2P table includes 1024 pages. Referring to FIG. 7, a second LPN LPN200 and a third LPN LPN3000 are existing modified pages, and the storage controller 210 may newly modify a first LPN LPN1600 according to a request of the host 100. Since the second LPN LPN200 is less than the first LPN LPN1600, the second LPN may be referred to as a previous LPN. Since the third LPN LPN3000 is greater than the first LPN LPN1600, the third LPN may be referred to as a next LPN. The first LPN LPN1600 may be referred to as a current LPN.

Referring to FIG. 7, when a second node and a third node already exist, the storage controller 210 may insert a first node between the second node and the third node. The storage controller 210 may identify a previous node of the first node and a next node of the first node, based on the size of LPNs and the structure of nodes. In some implementations, the second node and the third node are linked to each other, based on a doubly-linked list structure. In order to insert the first node, the storage controller 210 may identify the second LPN LPN200 less than the first LPN LPN1600, the third LPN LPN3000 greater than the first LPN LPN1600, and the doubly-linked list structure of the second node and the third node and may then insert the first node between the second node and the third node. According to some implementations, the second node and the third node are linked to each other, based on a tree structure and single-linked list structure. In order to insert the first node, the storage controller 210 may identify the second LPN LPN200 less than the first LPN LPN1600, the third LPN LPN3000 greater than the first LPN LPN1600, and the single-linked structure and tree structure of the second node and the third node and may then insert the first node between the second node and the third node. The first node corresponds to the first LPN LPN1600, and the third node corresponds to the third LPN LPN3000. Accordingly, the second node may be a previous node of the first node, and the third node may be a next node of the first node.

That is, the storage controller 210 may use a data structure for comparing the first node with the second node and the third node. In some implementations, when the second LPN LPN200 and the third LPN LPN3000 already exist and the storage controller 210 newly modifies the first LPN LPN1600, the storage controller 210 may insert the first node and may doubly link each of the second node and the third node to the first node. That is, the first node to the third node may have a doubly-linked list structure. According to some implementations, when the second LPN LPN200 and the third LPN LPN3000 already exist and the storage controller 210 newly modifies the first LPN LPN1600, the storage controller 210 may insert the first node and may link the first node to the third node to have a tree structure and single-linked list structure.

The storage controller 210 may determine whether L2P table #2 including the third LPN LPN3000 is the same as L2P table #1 including the first LPN LPN1600. The storage controller 210 may determine whether L2P table #0 including the second LPN LPN200 is the same as L2P table #1 including the first LPN LPN1600. When L2P table #1 is the same as at least one of L2P table #2 and L2P table #0, the storage controller 210 may maintain, without increasing, a comparison-based dirty L2P table counter. Since L2P table #1 is different from both of L2P table #0 and L2P table #2, the storage controller 210 may increase the comparison-based dirty L2P table counter by 1.

For example, the storage controller 210 may determine whether the quotient (1) obtained by dividing the first LPN LPN1600 by 1024 is the same as at least one of the quotient (2) obtained by dividing the third LPN LPN3000 by 1024 and the quotient (0) obtained by dividing the second LPN LPN200 by 1024. Since the quotients are all different from each other, the storage controller 210 may increase the comparison-based dirty L2P table counter by 1.

Figure 8:
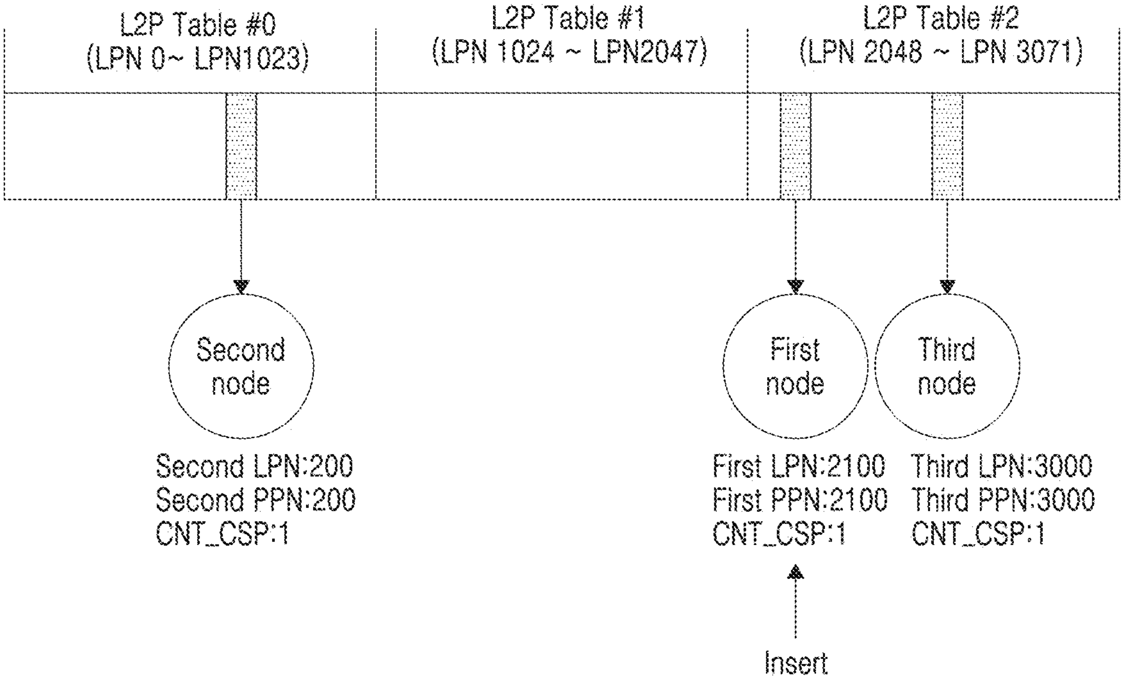
FIG. 8 illustrates an example of a method of managing a comparison-based dirty L2P table counter.

FIG. 8 illustrates an example of a method of managing a comparison-based dirty L2P table counter.

FIG. 8 may be described with reference to FIGS. 1 and 5 to 7, and a repeated description may be omitted. It is assumed that an L2P table includes 1024 pages. Referring to FIG. 8, a second LPN LPN200 and a third LPN LPN3000 are existing modified pages, and the storage controller 210 may newly modify a first LPN LPN2100 according to a request of the host 100. Since the third LPN LPN3000 is greater than the first LPN LPN2100, the third LPN may be referred to as a next LPN. The first LPN LPN2100 may be referred to as a current LPN.

Referring to FIG. 8, when a second node and a third node already exist, the storage controller 210 may insert a first node between the second node and the third node. The storage controller 210 may identify a previous node of the first node and a next node of the first node, based on the size of LPNs and the structure of nodes.

That is, the storage controller 210 may use a data structure for comparing the first node with the second node and the third node. In some implementations, when the second LPN LPN200 and the third LPN LPN3000 already exist and the storage controller 210 newly modifies the first LPN LPN2100, the storage controller 210 may insert the first node and may doubly link each of the second node and the third node to the first node. That is, the first node to the third node may have a doubly-linked list structure. According to some implementations, when the second LPN LPN200 and the third LPN LPN3000 already exist and the storage controller 210 newly modifies the first LPN LPN2100, the storage controller 210 may insert the first node and may link the first node to the third node to have a tree structure and single-linked list structure.

The storage controller 210 may determine whether L2P table #2 including the third LPN LPN3000 is the same as L2P table #2 including the first LPN LPN2100. The storage controller 210 may determine whether L2P table #0 including the second LPN LPN200 is the same as L2P table #2 including the first LPN LPN2100. Since L2P table #2 is the same as at least one of L2P table #0 and L2P table #2, the storage controller 210 may maintain a comparison-based dirty L2P table counter.

Specifically, the storage controller 210 may maintain the comparison-based dirty L2P table counter, since the quotient (2) obtained by dividing the first LPN LPN2100 by 1024 is the same as the quotient (2) obtained by dividing the third LPN LPN3000 by 1024 among the quotient (2) obtained by dividing the third LPN LPN3000 by 1024 and the quotient (0) obtained by dividing the second LPN LPN200 by 1024.

Figure 9:
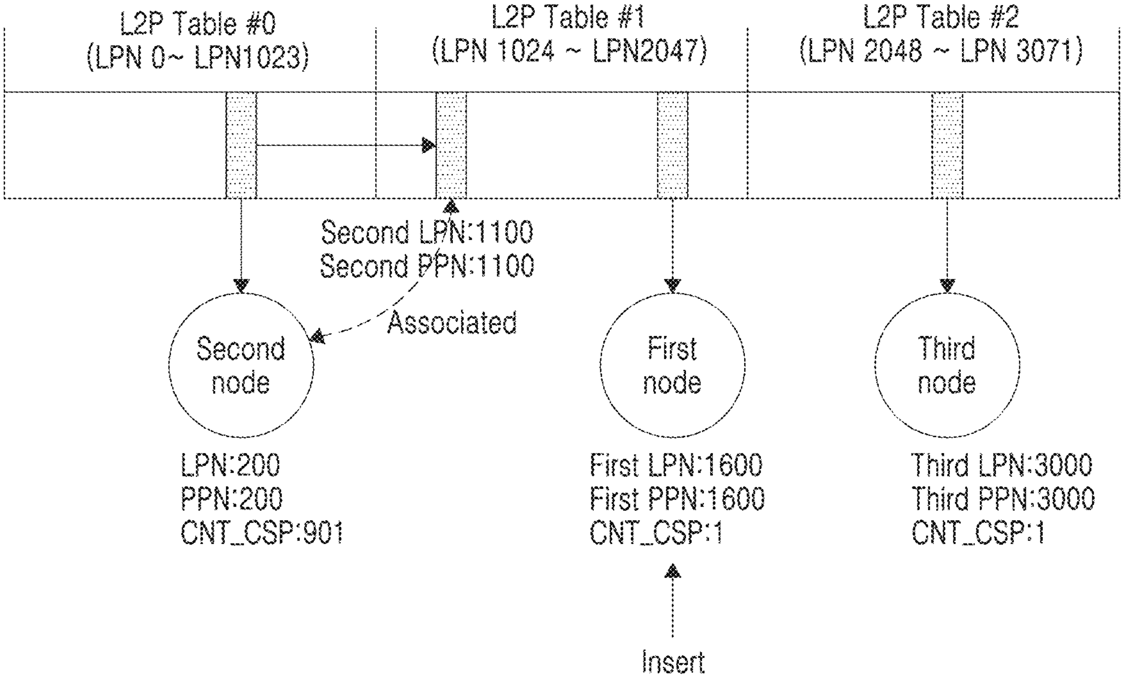
FIG. 9 illustrates an example of a method of managing a comparison-based dirty L2P table counter.

FIG. 9 illustrates an example of a method of managing a comparison-based dirty L2P table counter.

FIG. 9 may be described with reference to FIGS. 1 and 5 to 8, and a repeated description may be omitted. It is assumed that an L2P table includes 1024 pages.

Referring to FIG. 9, a second LPN LPN1100 and a third LPN LPN3000 are existing modified pages, and the storage controller 210 may newly modify a first LPN LPN1600 according to a request of the host 100. Since the second LPN LPN1100 is less than the first LPN LPN1600, the second LPN LPN1100 may be referred to as a previous LPN. Since the third LPN LPN3000 is greater than the first LPN LPN1600, the third LPN LPN3000 may be referred to as a next LPN. The first LPN LPN1600 may be referred to as a current LPN.

Referring to FIG. 9, when a second node and a third node already exist, the storage controller 210 may insert a first node between the second node and the third node. The first node corresponds to the first LPN LPN1600. The third node corresponds to the third LPN LPN3000. The second node corresponds to an LPN200 and may be associated with the second LPN LPN1100. Accordingly, the second node may be a previous node of the first node, and the third node may be a next node of the first node. The second node may include information on the number CNT_CSP of pages consecutive from the LPN200. A value of the number CNT_CSP of pages consecutive from the LPN200 is equal to 901. Accordingly, the existing modified pages exist consecutively from the LPN200 to the second LPN LPN1100.

The storage controller 210 may identify information on the number CNT_CSP of pages consecutive from the LPN200 of the second node and identify the second LPN LPN1100 closest to the first LPN LPN1600 among the consecutive LPNs. That is, the storage controller 210 may identify the greatest second LPN LPN1100 among the consecutive LPNs. As an example, the storage controller 210 may identify the second LPN LPN1100, based on the least LPN LPN200 of an LPN group closest to the first LPN LPN1600 among LPNs less than the first LPN LPN1600 and the information (CNT_CSP=901) on the number of consecutive LPNs. When the number CNT_CSP of pages consecutive from the LPN200 of the second node is equal to 1, the second node may be associated with the LPN200 and may correspond to the LPN200.

The storage controller 210 may identify a previous node of the first node and a next node of the first node, based on the size of LPNs and the structure of nodes. In some implementations, the second node and the third node are linked to each other, based on a doubly-linked list structure. In order to insert the first node, the storage controller 210 may identify the second LPN LPN1100 less than the first LPN LPN1600, the third LPN LPN3000 greater than the first LPN LPN1600, and the doubly-linked list structure of the second node and the third node and may then insert the first node between the second node and the third node. According to some implementations, the second node and the third node are linked to each other, based on a tree structure and single-linked list structure. In order to insert the first node, the storage controller 210 may identify the second LPN LPN200 less than the first LPN LPN1600, the third LPN LPN3000 greater than the first LPN LPN1600, and the single-linked structure and tree structure of the second node and the third node and may then insert the first node between the second node and the third node.

The storage controller 210 may determine whether L2P table #2 including the third LPN LPN3000 is the same as L2P table #1 including the first LPN LPN1600. The storage controller 210 may determine whether L2P table #1 including the second LPN LPN1100 is the same as L2P table #1 including the first LPN LPN1600. Since L2P table #1 is the same as at least one of L2P table #0 and L2P table #1, the storage controller 210 may maintain, without increasing, a comparison-based dirty L2P table counter.

For example, the storage controller 210 may determine whether the quotient (1) obtained by dividing the first LPN LPN1600 by 1024 is the same as at least one of the quotient (2) obtained by dividing the third LPN LPN3000 by 1024 and the quotient (1) obtained by dividing the second LPN LPN1100 by 1024. The storage controller 210 may maintain the comparison-based dirty L2P table counter since the quotient (1) obtained by dividing the first LPN LPN1600 by 1024 is the same as at least one of the quotient (2) obtained by dividing the third LPN LPN3000 by 1024 and the quotient (1) obtained by dividing the second LPN LPN1100 by 1024.

Figure 10:
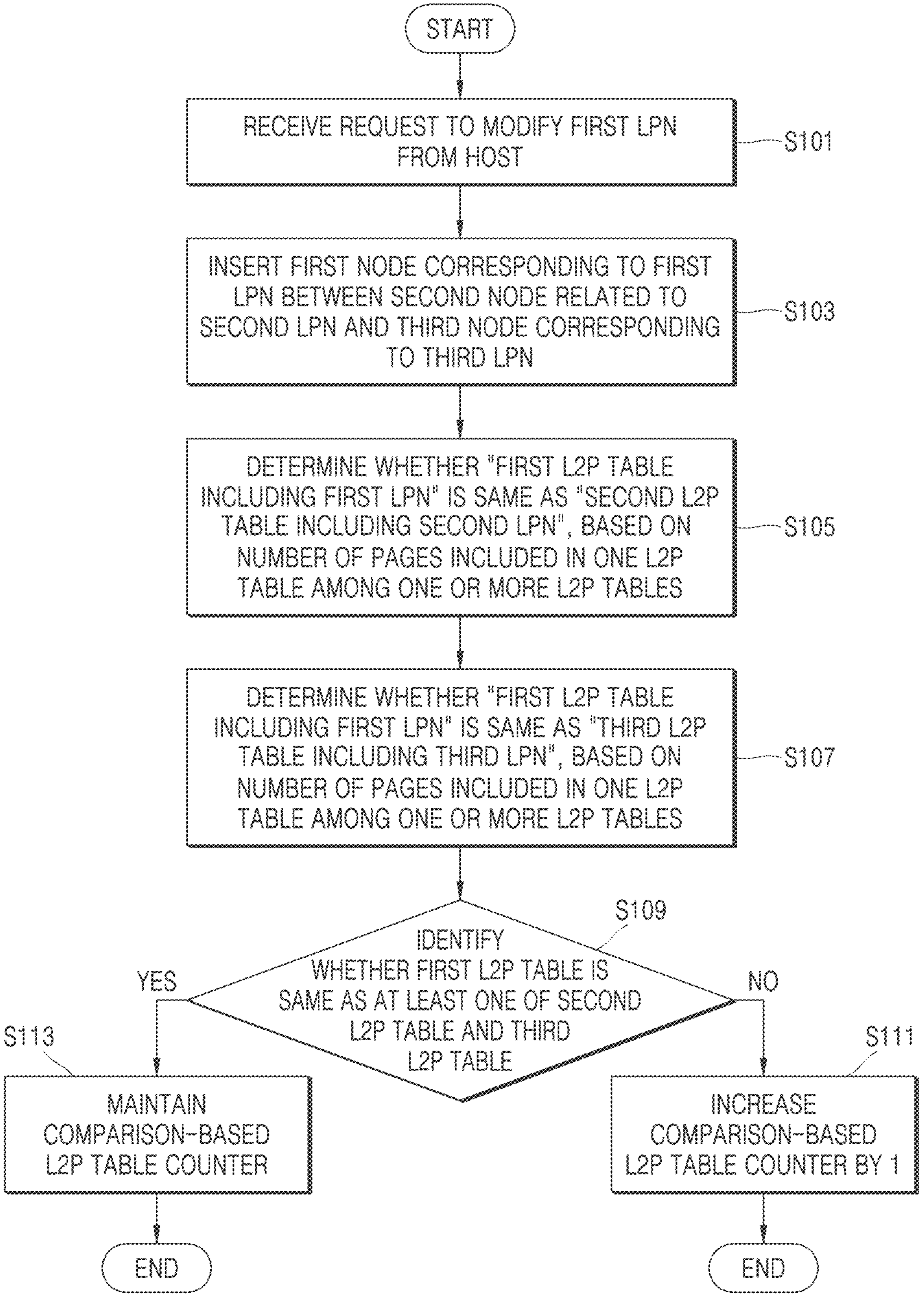
FIG. 10 illustrates an example of a method of operating a storage controller.
Figure 11:
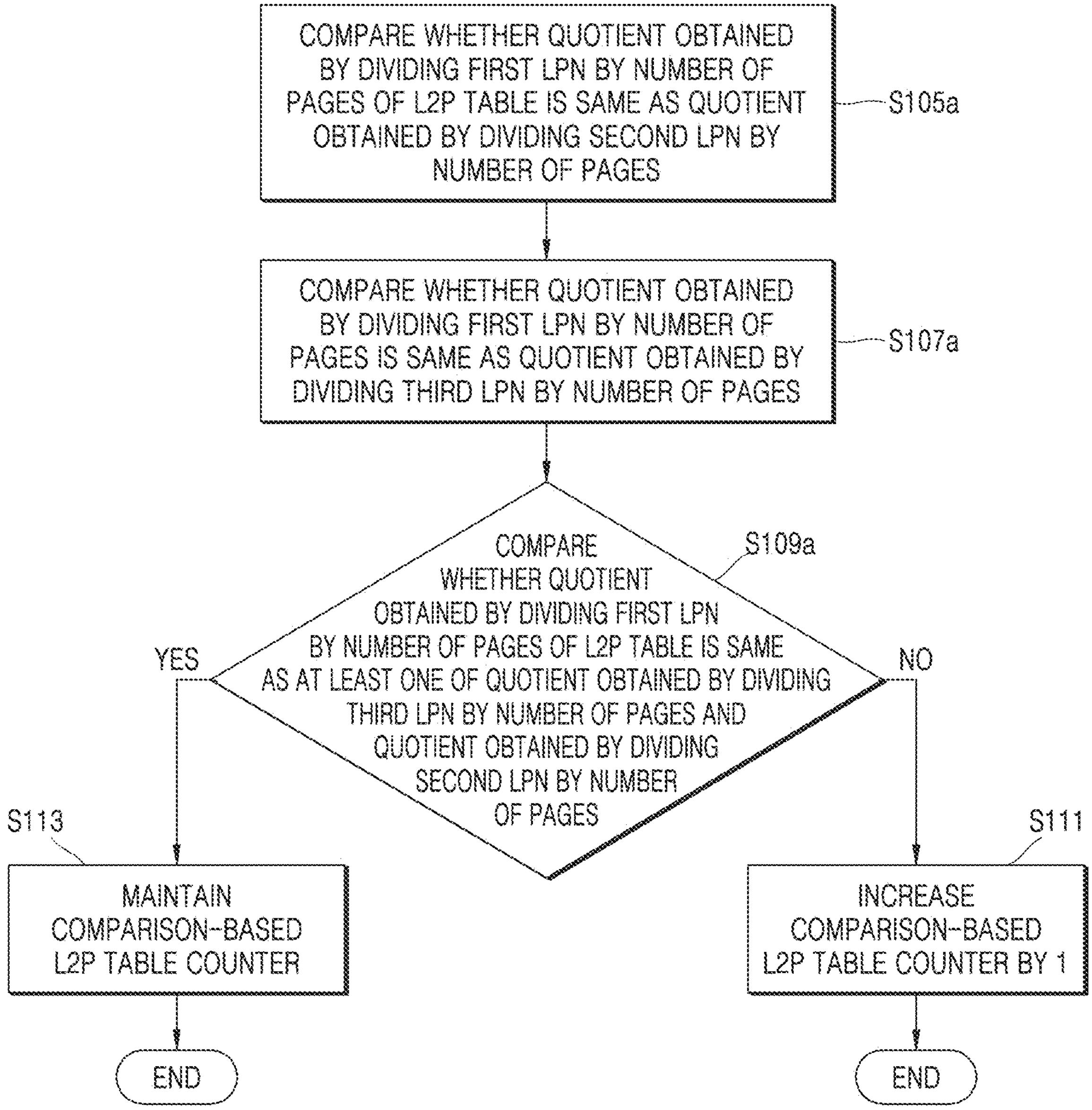
FIG. 11 illustrates an example of L2P table identity determination.

FIG. 10 illustrates an example of a method of operating a storage controller. FIG. 11 illustrates an example of L2P table identity determination.

FIGS. 10 and 11 may be described with reference to FIGS. 1 and 5 to 9, and a repeated description may be omitted.

Referring to FIG. 10, in step S101, the storage controller 210 may receive a request to modify a first LPN from a host. Modification may include update and discard.

In step S103, the storage controller 210 may insert a first node corresponding to the first LPN between a second node related to a second LPN and a third node corresponding to a third LPN. In some implementations, the first node, the second node, and the third node may have a doubly-linked list structure. According to some implementations, the first node, the second node, and the third node may have a single-linked list structure and tree structure at the same time. The storage controller 210 may find the second node and the third node through tree traverse.

The second LPN is the greatest value in an LPN group closest to the first LPN among LPNs less than the first LPN.

The LPN group may include at least one consecutive LPN. For example, in the description given with reference to FIG. 9, LPN200 to LPN1100 are an LPN group closest to the first LPN, and here the greatest LPN is LPN1100. The third LPN is the least value among LPNs greater than the first LPN. It is assumed that both of the LPN group and the third LPN are valid pages.

Furthermore, the storage controller 210 may perform an invalidation check for the first LPN. For example, when the first LPN is already valid before insertion of the first node, the storage controller 210 may not increase, e.g., may bypass an increase in, a comparison-based dirty L2P table counter.

The storage controller 210 may identify the second node and the third node, based on the first LPN and the structure of the second node and the third node. Also, the second node may include information on the number of consecutive LPNs in an LPN group closest to the first LPN among LPNs less than the first LPN. The storage controller 210 may identify the second LPN, based on the least LPN of the LPN group closest to the first LPN among the LPNs less than the first LPN and the information on the number of consecutive LPNs.

In step S105, the storage controller 210 may determine whether a "first L2P table including the first LPN" is the same as a "second L2P table including the second LPN", based on the number of pages included in one L2P table among one or more L2P tables. For example, referring to FIG. 11, in step S105*a*, the storage controller 210 may compare whether the quotient obtained by dividing the first LPN by the number of pages of the L2P table is the same as the quotient obtained by dividing the second LPN by the number of pages.

In step S107, the storage controller 210 may determine whether the "first L2P table including the first LPN" is the same as a "third L2P table including the third LPN", based on the number of pages included in one L2P table among the one or more L2P tables. For example, referring to FIG. 11, in step S107*a*, the storage controller 210 may compare whether the quotient obtained by dividing the first LPN by the number of pages is the same as the quotient obtained by dividing the third LPN by the number of pages.

In step S109, the storage controller 210 may identify whether the first L2P table is the same as at least one of the second L2P table and the third L2P table. For example, referring to FIG. 11, in step S109*a*, the storage controller 210 may compare whether the quotient obtained by dividing the first LPN by the number of pages of the L2P table is the same as at least one of the quotient obtained by dividing the third LPN by the number of pages and the quotient obtained by dividing the second LPN by the number of pages.

In step S111, when the quotient obtained by dividing the first LPN by the number of pages of the L2P table is different from both of the quotient obtained by dividing the third LPN by the number of pages and the quotient obtained by dividing the second LPN by the number of pages, the storage controller 210 may increase a comparison-based dirty L2P table counter by 1.

In step S113, when the quotient obtained by dividing the first LPN by the number of pages of the L2P table is the same as at least one of the quotient obtained by dividing the third LPN by the number of pages and the quotient obtained by dividing the second LPN by the number of pages, the storage controller 210 may maintain the comparison-based dirty L2P table counter.

In some implementations, the storage controller 210 may flush the L2P tables to the nonvolatile memory 220, based on at least one of the number of the L2P tables and a comparison-based L2P counter value. By flushing the L2P tables to the nonvolatile memory 220, the storage controller 210 may make the L2P tables stored in the nonvolatile memory 220 be identical to L2P tables modified in the SRAM 230.

Figure 12:
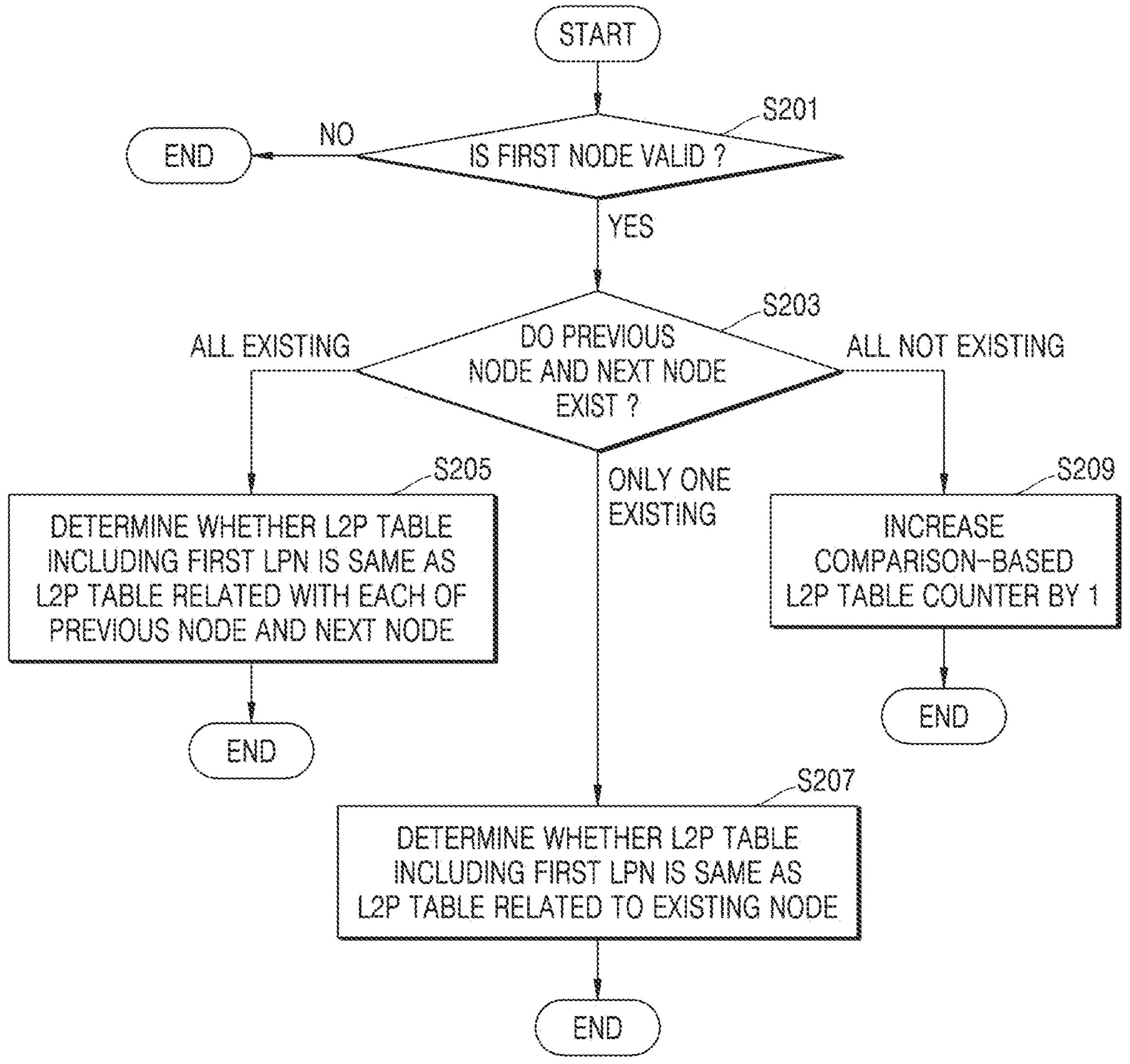
FIG. 12 illustrates an example of a method of operating a storage controller.

FIG. 12 illustrates an example of a method of operating a storage controller.

FIG. 12 may be described with reference to FIGS. 1 and 5 to 9, and a repeated description may be omitted.

The storage controller 210 may modify a first LPN according to a request of the host 100. The storage controller 210 may determine whether to increase a comparison-based dirty L2P table counter according to the modification of the first LPN as follows. A first node corresponds to the first LPN.

In step S201, the storage controller 210 may determine whether the first node is valid. When the first node is invalid, the storage controller 210 may not increase the comparison-based dirty L2P table counter.

In step S203, when the first node is valid, the storage controller 210 may identify whether a previous node and a next node exist.

In step S205, when all the previous node and the next node exist, the storage controller 210 may determine whether an L2P table including the first LPN is the same as an L2P table related with each of the previous node (second node) and the next node (third node). When the L2P table including the first LPN is different from both of an L2P table including a second LPN and an L2P table including a third LPN, the storage controller 210 may increase the comparison-based dirty L2P table counter.

In step S207, when only one of the previous node and the next node exists, the storage controller 210 may determine whether the L2P table including the first LPN is the same as an L2P table related to the existing node. For example, when the previous node exists, the storage controller 210 may increase the comparison-based dirty L2P table counter when the L2P table including the first LPN is different from the L2P table including the second LPN.

In step S209, when both of the previous node and the next node do not exist, the storage controller 210 may increase the comparison-based dirty L2P table counter by 1.

Figure 13:
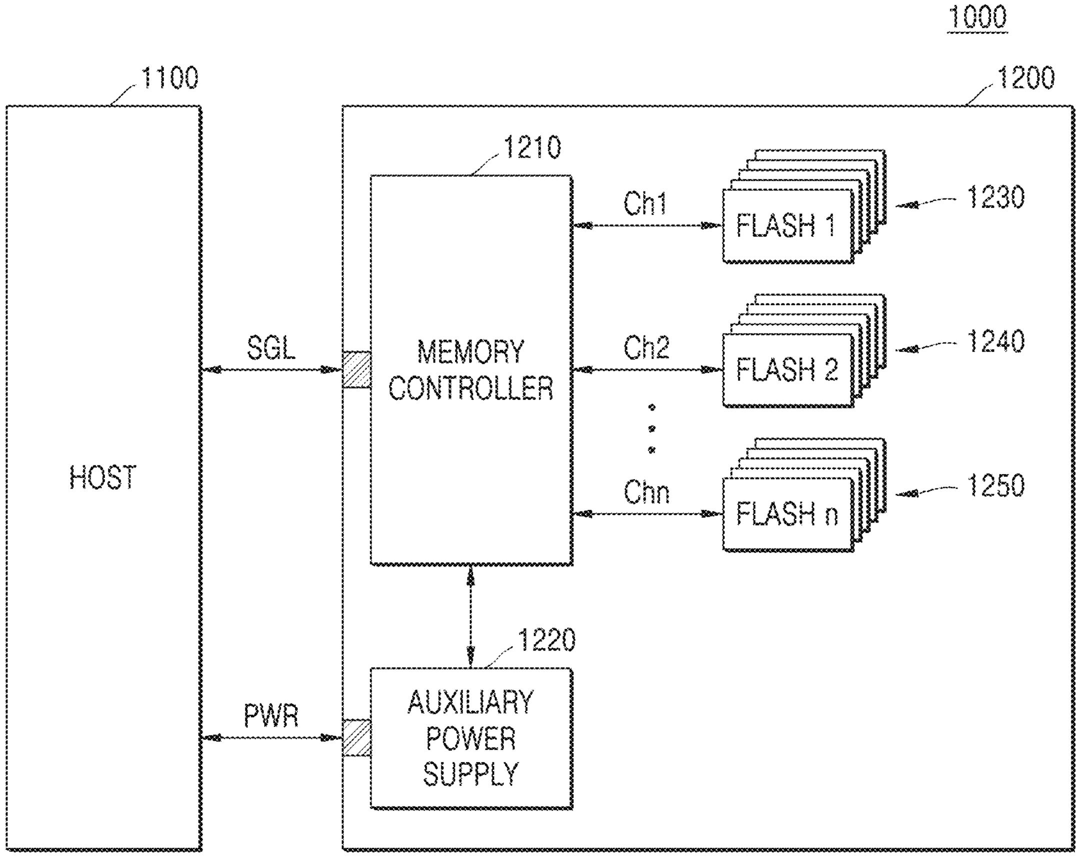
FIG. 13 illustrates an example of an operation procedure of a computing device.

FIG. 13 illustrates an example of an operation procedure of a computing device.

Referring to FIG. 13, an SSD system 1000 may include a host 1100 and an SSD 1200. The SSD 1200 may exchange signals (SGL) with the host 1100 through a signal connector and receive power (PWR) through a power connector. The SSD 1200 may include a memory controller 1210, an auxiliary power supply 1220, and a plurality of memory devices 1230, 1240, and 1250.

The plurality of memory devices 1230, 1240, and 1250 are connected to the memory controller 1210 through channels Ch1 to Chn. According to some implementations, the memory controller 1210 may perform operations of loading, updating, and storing an L2P table. In addition, the storage controller 210 may maintain or increase a comparison-based dirty L2P table counter by comparing a node corresponding to a newly inserted LPN with each of a previous node and a next node.

Figure 14:
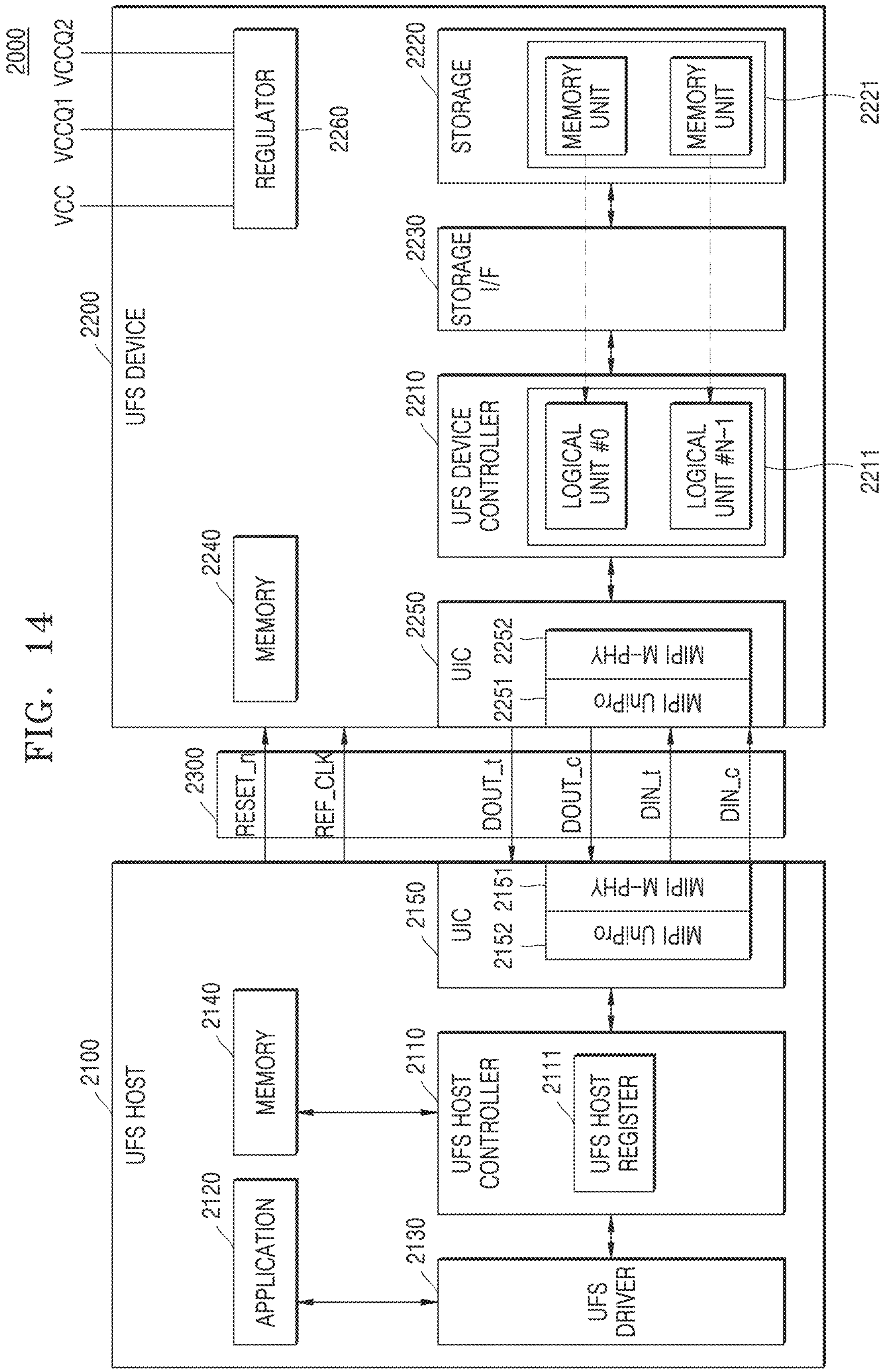
FIG. 14 illustrates an example of a block diagram of a UFS system.

FIG. 14 illustrates an example of a block diagram of a universal flash storage (UFS) system.

A UFS system 2000 is a system complying with the UFS standard published by the Joint Electron Device Engineering Council (JEDEC) and may include a UFS host 2100, a UFS device 2200, and a UFS interface 2300. The above description of the host-storage system 10 of FIG. 1 may also be applied to the UFS system 2000 of FIG. 14 to the extent of not conflicting with the following description of FIG. 14.

Referring to FIG. 14, the UFS host 2100 and the UFS device 2200 may be interconnected through the UFS interface 2300. The UFS host 2100 may be implemented as part of an application processor.

The UFS host 2100 may perform the operations of the host 100 of FIGS. 1 and 2, and the UFS device 2200 may perform the operations of the storage device 200 of FIGS. 1 and 2. The UFS host 2100 may perform the operations of the host 100 described above. The UFS device 2200 may perform the operations of the storage device 200 described above.

The UFS host 2100 may include a UFS host controller 2110, an application 2120, a UFS driver 2130, a host memory 2140, and a UFS interconnect (UIC) layer 2150. The UFS device 2200 may include a UFS device controller 2210, a nonvolatile storage 2220, a storage interface 2230, a device memory 2240, a UIC layer 2250, and a regulator 2260. The nonvolatile storage 2220 may be composed of a plurality of storage units 2221, and the storage units 2221 may include V-NAND flash memories of a 2D structure or 3D structure, but may also include different types of nonvolatile memories such as a PRAM and/or an RRAM. The UFS device controller 2210 may be connected to the nonvolatile storage 2220 through the storage interface 2230. The storage interface 2230 may be implemented to comply with standard protocols such as Toggle or ONFI.

The application 2120 may mean a program that intends to communicate with the UFS device 2200 in order to use the function of the UFS device 2200. The application 2120 may transmit an input-output request (IOR) to the UFS driver 2130, for the sake of input/output to the UFS device 2200. The input/output request (IOR) may mean a data read request, write request, and/or discard request, etc., but is not necessarily limited thereto.

The UFS driver 2130 may manage the UFS host controller 2110 through a UFS-host controller interface (UFS-HCI). The UFS driver 2130 may convert an input/output request generated by the application 2120 into a UFS command defined by the UFS standard, and deliver the converted UFS command to the UFS host controller 2110. One input/output request may be converted into a plurality of UFS commands. The UFS commands may basically include commands defined by the small computer system interface (SCSI) standard, but may also include UFS standard dedicated commands.

The UFS host controller 2110 may transmit a UFS command converted by the UFS driver 2130 to the UIC layer 2250 of the UFS device 2200 through the UIC layer 2150 and the UFS interface 2300. In this process, a UFS host register 2111 of the UFS host controller 2110 may function as a command queue (CQ).

The UIC layer 2150 of the UFS host 2100 side may include a mobile industry processor interface (MIPI) physical layer (M-PHY) 2151 and an MIPI UniPro 2152, and the UIC layer 2250 of the UFS device 2200 side may also include an MIPI M-PHY 2252 and an MIPI UniPro 2251.

The UFS interface 2300 may include a line transmitting a reference clock REF_CLK, a line transmitting a hardware reset signal RESET_n for the UFS device 2200, a pair of lines transmitting a pair of differential input signals DIN_t and DIN_c, and a pair of lines transmitting a pair of differential output signals DOUT_t and DOUT_c.

A frequency value of the reference clock provided from the UFS host 2100 to the UFS device 2200 may include one of four values of 19.2 MHZ, 26 MHz, 38.4 MHZ, and 52 MHz, but is not necessarily limited thereto. The UFS host 2100 may modify the frequency value of the reference clock even during operation, that is, even while data transmission and reception are performed between the UFS host 2100 and the UFS device 2200. The UFS device 2200 may generate clocks of various frequencies from the reference clock provided from the UFS host 2100 by using a phase-locked loop (PLL) or the like. Also, the UFS host 2100 may also set a value of a data rate between the UFS host 2100 and the UFS device 2200 through the frequency value of the reference clock. That is, the value of the data rate may be determined depending on the frequency value of the reference clock.

The UFS interface 2300 may support multiple lanes, and each lane may be implemented as a differential pair. For example, the UFS interface 2300 may include one or more receive lanes and one or more transmit lanes. The pair of lines transmitting the differential input signal pair DIN_t and DIN_c may constitute the receive lane, and the pair of lines transmitting the differential output signal pair DOUT_t and DOUT_c may constitute the transmit lane, respectively. Although FIG. 2 illustrates one transmit lane and one receive lane, the number of transmit lanes and receive lanes may be changed.

The receive lane and the transmit lane may transmit data in a serial communication method, and a structure in which the receive lane and the transmit lane are separated enables full-duplex communication between the UFS host 2100 and the UFS device 2200. That is, the UFS device 2200 may transmit data to the UFS host 2100 through the transmit lane, even while receiving data from the UFS host 2100 through the receive lane. Also, control data such as commands from the UFS host 2100 to the UFS device 2200, and user data that the UFS host 2100 intends to store in the nonvolatile storage 2220 of the UFS device 2200 or intends to read from the nonvolatile storage 2220 may be transmitted through the same lane. Accordingly, there is no need to provide a separate lane for data transmission between the UFS host 2100 and the UFS device 2200 in addition to a pair of receive lanes and a pair of transmit lanes.

The UFS device controller 2210 of the UFS device 2200 may generally control the operation of the UFS device 2200. The UFS device controller 2210 may manage the nonvolatile storage 2220 through a logical unit (LU) 2211, which is a logical data storage unit. The number of LUs 2211 may be equal to 8, but is not limited thereto. The UFS device controller 2210 may include an FTL, and may translate a logical data address delivered from the UFS host 2100, for example, a logical block address (LBA) into a physical data address, for example, a physical block address (PBA) by using address mapping information of the FTL. In the UFS system 2000, a logical block for storing user data may have a certain range of size. For example, the minimum size of the logical block may be set to 4 Kbytes.

The UFS device controller 2210 may correspond to the storage controller 210 of the storage device 200 of FIGS. 1 and 2. Accordingly, the UFS device controller 2210 may maintain or increase a comparison-based dirty L2P table counter by comparing a node corresponding to a newly inserted LBA with each of a previous node and a next node.

When a command from the UFS host 2100 is inputted to the UFS device 2200 through the UIC layer 2250, the UFS device controller 2210 may perform an operation in response to the inputted command, and transmit a completion response to the UFS host 2100 when the operation is completed.

As an example, when the UFS host 2100 intends to store user data in the UFS device 2200, the UFS host 2100 may transmit a data storage command to the UFS device 2200. Upon receiving a ready-to-transfer response from the UFS device 2200, the UFS host 2100 may transfer the user data to the UFS device 2200. The UFS device controller 2210 may temporarily store the received user data in the device memory 2240, and store the user data temporarily stored in the device memory 2240, in a selected location of the nonvolatile storage 2220, based on the address mapping information of the FTL.

As another example, when the UFS host 2100 intends to read user data stored in the UFS device 2200, the UFS host 2100 may transmit a data read command to the UFS device 2200. The UFS device controller 2210, which has received the command, may read user data from the nonvolatile storage 2220, based on the data read command, and may temporarily store the read user data in the device memory 2240. During this read process, the UFS device controller 2210 may detect and correct errors in the read user data by using a built-in ECC circuit. And, the UFS device controller 2210 may transmit user data temporarily stored in the device memory 2240, to the UFS host 2100. In addition, the UFS device controller 2210 may further include an AES circuit, and the AES circuit may encrypt or decrypt data input to the UFS device controller 2210 by using a symmetric-key algorithm.

The UFS host 2100 may store commands to be transmitted to the UFS device 2200 in order in the UFS host register 2111 that may function as a command queue, and transmit the commands to the UFS device 2200 in the order. At this time, even when a previously transmitted command is still being processed by the UFS device 2200, that is, even before the UFS host 2100 receives a notification that the processing of the previously transmitted command has been completed by the UFS device 2200, the UFS host 2100 may transmit a next command waiting in the command queue to the UFS device 2200, and accordingly the UFS device 2200 may also receive the next command from the UFS host 2100 even while processing the previously transmitted command. The maximum number (queue depth) of commands that may be stored in such a command queue may be, for example, 32. Also, the command queue may be implemented in a circular queue type that indicates the start and end of a command sequence stored in the queue through a head pointer and a tail pointer, respectively.

Each of the plurality of storage units 2221 may include a memory cell array and a control circuit that controls the operation of the memory cell array. The memory cell array may include a two-dimensional memory cell array or a three-dimensional memory cell array. The memory cell array may include a plurality of memory cells, and each memory cell may include a cell (single level cell (SLC)) that stores one bit of information, but may also include a cell that stores two or more bits of information, such as a multi level cell (MLC), a triple level cell (TLC), and a quadruple level cell (QLC). The three-dimensional memory cell array may include a vertical NAND string that is vertically oriented such that at least one memory cell is located above another memory cell.

Power supply voltages such as VCC, VCCQ1, VCCQ2, etc. may be inputted to the UFS device 2200. VCC is a main power supply voltage for the UFS device 2200 and may have a value of about 2.4 V to about 3.6 V. VCCQ1 is a power supply voltage for supplying a low range voltage, and is mainly for the UFS device controller 2210, and may have a value of about 1.14 V to about 1.26 V. VCCQ2 is a power supply voltage for supplying a voltage range lower than VCC but higher than VCCQ1, and is mainly for the input/output interface such as MIPI M-PHY 2252, and may have a value of about 1.7 V to about 1.95 V. The power supply voltages may be supplied to respective components of the UFS device 2200 through the regulator 2260. The regulator 2260 may be implemented as a set of unit regulators each connected to a different one of the above-described power supply voltages.

As above, the implementations are disclosed in the drawings and specifications. In this specification, the implementations have been described using specific terms, but this is only used for the purpose of explaining the technical idea of the present disclosure and is not used to limit the meaning or scope of the present disclosure as set forth in the claims. Therefore, those skilled in the art will understand that various modifications and other equivalent implementations are possible. Therefore, the scope of the present disclosure should be defined by the technical spirit of the attached claims.

While this specification contains many specific implementation details, these should not be construed as limitations on the scope of any invention or on the scope of what may be claimed, but rather as descriptions of features that may be specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations, one or more features from a combination can in some cases be excised from the combination, and the combination may be directed to a subcombination or variation of a subcombination.

While the present disclosure has been shown and described with reference to implementations thereof, it will be understood that various changes in form and details may be made therein without departing from the spirit and scope of the following claims.

What is claimed is:

1. A method of operating a storage controller that stores one or more logical to physical (L2P) tables, the method comprising:

receiving a request to modify a first logical page number (LPN) from a host;

inserting a first node between a second node and a third node, the first node corresponding to the first LPN, the second node related to a second LPN, and the third node corresponding to a third LPN;

determining whether a first L2P table is the same as a second L2P table based on a number of pages in an L2P table of the one or more L2P tables, the first L2P table comprising the first LPN, and the second L2P table comprising the second LPN;

determining whether the first L2P table is the same as a third L2P table based on the number of pages in the L2P table of the one or more L2P tables, the third L2P table comprising the third LPN; and increasing a comparison-based dirty L2P table counter by 1 based on the first L2P table being different from both the second L2P table and the third L2P table, wherein the second LPN is largest in an LPN group, the LPN group being closest to the first LPN among a plurality of LPN groups, the LPN group being less than the first LPN, wherein the LPN group comprises at least one consecutive LPN, wherein the third LPN is smallest among a plurality of LPNs that are greater than the first LPN, and wherein the first node, the second node, and the third node have a doubly-linked list structure.

2. The method of claim 1, comprising bypassing an increase in the comparison-based dirty L2P table counter based on the first L2P table being the same as at least one of the second L2P table or the third L2P table.

3. The method of claim 1, wherein determining whether the first L2P table is the same as the second L2P table comprises determining whether a first quotient is the same as a second quotient, the first quotient obtained based on dividing the first LPN by the number of pages, the second quotient obtained based on dividing the second LPN by the number of pages, and wherein determining whether the first L2P table is the same as the third L2P table comprises determining whether the first quotient is the same as a third quotient, the third quotient obtained based on dividing the third LPN by the number of pages.

4. The method of claim 1, comprising bypassing an increase in the comparison-based dirty L2P table counter based on the first LPN being valid before inserting the first node.

5. The method of claim 1, comprising flushing the one or more L2P tables to a nonvolatile memory based on at least one of a number of tables of the one or more L2P tables or a comparison-based L2P counter value.

6. The method of claim 1, wherein the second node comprises information on a number of consecutive LPNs of the LPN group.

7. The method of claim 6, comprising identifying the second LPN based on a smallest LPN of the LPN group and the information on the number of consecutive LPNs.

8. A method of operating a storage controller that stores one or more logical to physical (L2P) tables, the method comprising:

receiving a request to modify a first logical page number (LPN) from a host;

inserting a first node between a second node and a third node, the first node corresponding to the first LPN, the second node related to a second LPN, and the third node related to a third LPN;

determining whether a first L2P table is the same as a second L2P table based on a number of pages in an L2P table of the one or more L2P tables, the first L2P table comprising the first LPN, and the second L2P table comprising the second LPN;

determining whether the first L2P table is the same as a third L2P table based on the number of pages in the L2P table of the one or more L2P tables, the third L2P table comprising the third LPN; and increasing a comparison-based dirty L2P table counter by 1 based on the first L2P table being different from both the second L2P table and the third L2P table, wherein the second LPN is largest in an LPN group, the LPN group being closest to the first LPN among a plurality of LPN groups, the LPN group being less than the first LPN, wherein the LPN group comprises at least one consecutive LPN, wherein the third LPN is smallest among a plurality of LPNs that are greater than the first LPN, and wherein the first node, the second node, and the third node have a single-linked list structure and tree structure.

9. The method of claim 8, comprising bypassing an increase in the comparison-based dirty L2P table counter based on the first L2P table being the same as at least one of the second L2P table or the third L2P table.

10. The method of claim 8, wherein determining whether the first L2P table is the same as the second L2P table comprises determining whether a first quotient is the same as a second quotient, the first quotient obtained based on dividing the first LPN by the number of pages, the second quotient obtained based on dividing the second LPN by the number of pages, and wherein determining whether the first L2P table is the same as the third L2P table comprises determining whether the first quotient is the same as a third quotient, the third quotient obtained based on dividing the third LPN by the number of pages.

11. The method of claim 8, comprising bypassing an increase in the comparison-based dirty L2P table counter based on the first LPN being valid before inserting the first node.

12. The method of claim 8, comprising flushing the one or more L2P tables to a nonvolatile memory based on at least one of a number of tables of the one or more L2P tables or a comparison-based L2P counter value.

13. The method of claim 8, wherein the second node comprises information on a number of consecutive LPNs of an LPN group.

14. The method of claim 13, comprising identifying the second LPN based on a smallest LPN of the LPN group and the information on the number of consecutive LPNs.

15. A storage controller comprising:

a static random access memory (SRAM) configured to store one or more logical to physical (L2P) tables, a comparison-based dirty L2P table counter, and a plurality of nodes corresponding to a plurality of logical page numbers (LPNs); and a processor, wherein the processor is configured to:

receive a request to modify a first LPN from a host;

insert a first node between a second node and a third node, the first node corresponding to the first LPN, the second node related to a second LPN, and the third node corresponding to a third LPN;

determine whether a first L2P table is the same as a second L2P table based on a number of pages in an L2P table of the one or more L2P tables, the first L2P table comprising the first LPN, and the second L2P table comprising the second LPN;

determine whether the first L2P table is the same as a third L2P table based on the number of pages in the L2P table of the one or more L2P tables, the third L2P table comprising the third LPN; and increase the comparison-based dirty L2P table counter by 1 based on the first L2P table being different from both the second L2P table and the third L2P table, wherein the second LPN is largest in an LPN group, the LPN group being closest to the first LPN among a plurality of LPN groups, the LPN group being less than the first LPN, wherein the LPN group comprises at least one consecutive LPN, wherein the third LPN is smallest among a plurality of LPNs that are greater than the first LPN, and wherein the first node, the second node, and the third node have a doubly-linked list structure.

16. The storage controller of claim 15, wherein the processor is configured to bypass an increase the comparison-based dirty L2P table counter based on the first L2P table being the same as at least one of the second L2P table or the third L2P table.

17. The storage controller of claim 15, wherein the processor is configured to:

determine whether the first L2P table is the same as the second L2P table based on determining whether a first quotient is the same as a second quotient, the first quotient obtained based on dividing the first LPN by the number of pages, the second quotient obtained based on dividing the second LPN by the number of pages; and determine whether the first L2P table is the same as the third L2P table based on determining whether the first quotient is the same as a third quotient, the third quotient obtained based on dividing the third LPN by the number of pages.

18. The storage controller of claim 15, wherein the processor is configured to bypass an increase the comparison-based dirty L2P table counter based on the first LPN being valid before inserting the first node.

19. The storage controller of claim 15, wherein the processor is configured to flush the one or more L2P tables to a nonvolatile memory based on at least one of a number of tables of the one or more L2P tables or a comparison-based L2P counter value.

20. The storage controller of claim 15, wherein the second node comprises information on a number of consecutive LPNs of the LPN group closest to the first LPN among LPN groups valid and less than the first LPN, and wherein the processor is configured to identify the second LPN based on a smallest LPN of the LPN group and the information on the number of consecutive LPNs.

* * * * *